United States Patent [19]
Araki

[11] Patent Number: 5,928,318
[45] Date of Patent: Jul. 27, 1999

[54] CLAMPING DIVIDER, PROCESSOR HAVING CLAMPING DIVIDER, AND METHOD FOR CLAMPING IN DIVISION

[75] Inventor: Yoshitsugu Araki, Hyogo-ken, Japan

[73] Assignee: Kabushiki Kaisha Toshiba, Kawasaki, Japan

[21] Appl. No.: 08/923,926

[22] Filed: Sep. 5, 1997

[30] Foreign Application Priority Data

Sep. 9, 1996 [JP] Japan ................................. 8-238003

[51] Int. Cl.$^6$ ................................................ G06F 7/52
[52] U.S. Cl. .......................................... 708/650; 708/654
[58] Field of Search ................... 364/736.01, 745.01, 364/745.03, 745.02, 748.04, 748.1, 737, 761–765

[56] References Cited

U.S. PATENT DOCUMENTS

| 4,999,801 | 3/1991 | Katsuno | 364/748.06 |
| 5,046,038 | 9/1991 | Briggs et al. | 364/765 |
| 5,307,303 | 4/1994 | Briggs et al. | 364/765 |
| 5,475,630 | 12/1995 | Briggs et al. | 364/765 |
| 5,798,955 | 8/1998 | Matsubara | 364/736.01 |

*Primary Examiner*—Hassan Kizou
*Assistant Examiner*—Douglas S. Lee
*Attorney, Agent, or Firm*—Foley & Lardner

[57] ABSTRACT

A clamping divider has a bit shifter, a multiple accumulator (MAC), and an output circuit. When executing a division with the use of a clamp value of $2^m$, the bit shifter shifts one of the divisor and dividend of the division, and the MAC subtracts the shifted one from the other to determine, before calculating a quotient of the division, whether or not a result of the division must be clamped.

23 Claims, 8 Drawing Sheets

FIG. 7A

| clock | reg10 | reg11 | reg12 | reg13 | reg14 | reg15 |
|---|---|---|---|---|---|---|
| 1 | en | en | | | | |
| 2 | | | en | | en | |
| 3 | | | | en | en | en |
| 4 | | | | | en | (en) |
| 5 | | | | | en | (en) |

FIG. 7B

| clock | reg10 | reg11 | reg12 | reg13 | reg14 | reg15 |
|---|---|---|---|---|---|---|
| 1 | en(1) | en(1) | | | | |
| 2 | | | en(1) | | en(1) | |
| 3 | | | | en(1) | en(1) | en(1) |
| 4 | | | | | en(1) | |
| 5 | en(2) | en(2) | | | en(1) | |
| 6 | | | en(2) | | en(2) | |
| 7 | | | | en(2) | en(2) | en(2) |
| 8 | | | | | en(2) | |
| 9 | | | | | en(2) | |
| 10 | | | | | en(2) | |

FIG. 7C

| clock | reg10 | reg11 | reg12 | reg13 | reg14 | reg15 |
|---|---|---|---|---|---|---|
| 1 | en(1) | en(1) | | | | |
| 2 | | | en(1) | | en(1) | |
| 3 | en(2) | en(2) | | | | |
| 4 | | | en(2) | | en(2) | |
| 5 | | | | en(2) | en(2) | en(2) |
| 6 | | | | | en(2) | |
| 7 | | | | | en(2) | |
| 8 | | | | | en(2) | |

FIG. 7D

| clock | reg10 | reg11 | reg12 | reg13 | reg14 | reg15 |
|---|---|---|---|---|---|---|
| 1 | en(1) | en(1) | | | | |
| 2 | | | en(1) | | en(1) | |
| 3 | | | | en(1) | en(1) | en(1) |
| 4 | en(2) | en(2) | | | | |
| 5 | | | en(2) | | en(2) | |
| 6 | | | | en(2) | en(2) | en(2) |
| 7 | | | | | en(2) | |
| 8 | | | | | en(2) | |
| 9 | | | | | en(2) | |

5,928,318

CLAMPING DIVIDER, PROCESSOR HAVING CLAMPING DIVIDER, AND METHOD FOR CLAMPING IN DIVISION

BACKGROUND OF THE INVENTION

1. Field of the Invention

The present invention relates to a clamping divider having a clamping function applicable to image processors and multimedia information processors, an information processor having such a clamping divider, and a method of clamping in division.

2. Description of the Prior Art

Processing image data in real time is essential to multimedia technology and requires high-speed operations. The image data processing involves intensity calculations that involve clamping. The clamping is an operation to fix a result of an execution to a maximum or a minimum if the result is out of a range defined by the maximum and minimum.

A division execution of "a/b" is carried out according to, for example, Newton-Raphson algorithm. This algorithm employs the steps of:

A. multiplying the divisor b by some power of 2 to satisfy "$1 \leq b < 2$" and retrieving a first approximate value $X_o$ of the reciprocal "1/b" of the divisor b from a table;

B. repeating a calculation of "$X_{l+1} = X_l \cdot (2 - X_l \cdot b)$" until a sufficiently accurate value $X_n$ is obtained; and C. calculating "$a \cdot X_n$", and multiplying "$a \cdot X_n$" by reciprocal of the "some power of 2" employed in the step A.

The algorithm involving these steps is called "the algorithm Newton" in the following explanation.

When carrying out a division with the clamping, a prior art first calculates a quotient of the division. If the quotient is out of a range defined by predetermined maximum and minimum, the quotient is clamped to the maximum or minimum, to provide a final result of the division execution.

FIG. 1 shows a clamping divider according to a prior art. A division and the clamping carried out by the prior art according to the algorithm Newton will be explained based on pipeline cycles.

In a first cycle, a divisor is set in a register 50 and a dividend in a register 51.

In a second cycle, the divisor is standardized so that it is equal to or greater than 1 and below 2. Namely, the register 50 provides an output b1 to a priority encoder 60, which provides an encoded result b2 to a barrel shifter 61. The barrel shifter 61 also receives the output b1 of the register 50 and provides a shifted result b3 to a register 52.

In a third cycle, the register 52 provides an output b4 to a ROM 62, which provides an accessed value b5 to a register 53. The value b5 is an approximate value of the reciprocal of the divisor. The second and third cycles correspond to the step A of the algorithm Newton.

In a fourth cycle, a selector 70 receives an output b6 from the register 53 and an output b7 from a register 54 and selects the output b6 as a selector output b8. A selector 71 receives the output b4 from the register 52 and an output b9 from the register 51 and selects the output b4 as a selector output b10. A selector 72 receives a value b11 of "2" and a rounding value b12 and selects the rounding value b11 as a selector output b13. The selector outputs b8, b10, and b13 are supplied to a multiple accumulator (MAC) 63 having an adder/subtracter and a multiplier. The outputs b8 and b10 serve as multiplication terms and the output b13 as an addition term, so that the MAC 63 calculates "2−b8×b10" and provides an output b14 to the register 54.

In a fifth cycle, the selector 70 receives the outputs b6 and b7 of the registers 53 and 54 and selects the output b7 as the selector output b8. The selector 71 receives the outputs b4 and b9 of the registers 52 and 51 and selects the output b4 as the selector output b10. The selector 72 receives the values b11 and b12 and selects the value b12 as the selector output b13. The selector outputs b8, b10, and b13 are supplied to the MAC 63, which calculates "b8×b10," carries out a rounding process, and provides a result b14 to the register 54. The fourth and fifth cycles increase the accuracy of the reciprocal of the divisor obtained in the third cycle and correspond to the step B of the algorithm Newton.

A sixth cycle and following cycles repeat the operations of the fourth and fifth cycles until required accuracy is obtained on the reciprocal of the divisor.

If the required accuracy is obtained on the reciprocal of the divisor, the reciprocal of the divisor is multiplied by the dividend. Namely, the selector 70 selects the output b7 between the outputs b6 and b7 of the registers 53 and 54 and provides the selected one as the selector output b8. The selector 71 selects the output b9 between the outputs b4 and b9 of the registers 52 and 51 and provides the selected one as the selector output b10. The selector 72 selects the rounding value b12 between the values b11 and b12 and provides the selected one as the selector output b13. The selector outputs b8, b10, and b13 are supplied to the MAC 63, which provides a resultant output b14 to the register 54.

In the next cycle, the barrel shifter 64 receives the output b7 of the register 54 and the output b15 of the register 55 and shifts the output b7 in a direction opposite to the shifting direction of the second cycle by the same number of bits as in the second cycle, thereby providing a shifted output b16, i.e., a quotient. This corresponds to the step C of the algorithm Newton. Storing the output b2 of the priority encoder 60 in the register 55 may be finished before the cycle to operate the barrel shifter 64.

Thereafter, the output b16 of the barrel shifter 64 is supplied to a clamp judge circuit 65, which determines whether or not the quotient must be clamped and provides, as an output b17, one of the maximum clamp value, minimum clamp value, and quotient.

In this way, the clamping divider of the prior art of FIG. 1 must calculate a quotient before the clamping. Therefore, the prior art needs a long time to provide a final result, i.e., the output b17 of the circuit 65, to deteriorate a division calculating speed. In addition, the prior art must separately have the dedicated clamp judge circuit 65 to increase the size of the clamping divider.

SUMMARY OF THE INVENTION

An object of the present invention is to provide a compact clamping divider capable of speedily carrying out division and clamping.

Another object of the present invention is to provide a compact and high speed information processor having a clamping divider.

Still another object of the present invention is to provide a method of carrying out division and clamping at high speed.

In order to accomplish the objects, a first aspect of the present invention provides a clamping divider that clamps a result of division to a maximum clamp value $2^m$ (m being an integer) if a quotient is equal to or larger than $2^m$, and to a minimum clamp value $2^n$ (n being an integer) if the quotient is equal to or smaller than $2^n$. The clamping divider has a bit shifter, a multiple accumulator (MAC), and an output circuit. When determining whether or not the quotient is equal to or larger than the maximum clamp value, the bit shifter shifts a divisor or a dividend in a higher or lower direction by m bits respectively, and when determining whether or not the quotient is equal to or smaller than the minimum clamp value, the bit shifter shifts the divisor or dividend in a higher or lower direction by n bits respectively. The MAC subtracts the shifted dividend or divisor from the divisor or dividend, and according to a result of the subtraction, determines whether or not the result of division must be clamped to the maximum or minimum clamp value, before actually calculating the quotient. According to the determination made by the MAC, the output circuit provides a final result of division.

The first aspect carries out the clamping before calculating a quotient instead of carrying out the clamping on a calculated quotient, thereby shortening a division execution time. The first aspect employs the MAC, which is originally used for calculating a quotient, to make the determination whether or not the clamping must be carried out, thereby eliminating the dedicated clamp judge circuit of the prior art and reducing the size of the clamping divider.

It is preferable for the first aspect to set the maximum clamp value to "1" or smaller, standardize a dividend by shifting the same similar to a divisor, and use the MAC to calculate a quotient by multiplying the shifted dividend by the. reciprocal of the divisor. Limiting the maximum clamp value to "1" or below may eliminate a shift operation to be carried out after multiplying a divisor by a dividend according to the Newton-Raphson method. This shortens a division calculating time and reduces the size of the clamping divider further.

A second aspect of the present invention provides a processor having the clamping divider of the first aspect, a unit for instructing the clamping divider to stop the present division execution by a division instruction if the clamping divider determines that the present division execution must be clamped, and a unit for instructing the clamping divider to start a next division execution by a next division instruction if the same follows just after the division instruction.

The second aspect is capable of finishing a division execution in a short time, improving throughput, shortening a total execution time, simplifying a system, and making the system compact.

A third aspect of the present invention provides a method of clamping a result of division. The method executes a division according to the Newton-Raphson algorithm and clamps a result of the division to a maximum clamp value of $2^m$ (m being an integer) if a quotient of the division is equal to or larger than the maximum clamp value, and to a minimum clamp value of $2^n$ (n being an integer) if the quotient is equal to or smaller than the minimum clamp value. When determining whether or not the quotient is equal to or larger than the maximum clamp value, the method shifts a divisor (or a dividend) in a higher (or lower) direction by m bits with the use of a bit shifter. When determining whether or not the quotient is equal to or smaller than the minimum clamp value, the method shifts the divisor (or dividend) in a higher (or lower) direction by n bits with the use of the bit shifter. The method employs a multiple accumulator (MAC), which is originally used to calculate a quotient, to subtract the shifted dividend or divisor from the divisor or dividend. According to a result of the subtraction, the method determines whether or not the division result must be clamped to the maximum or minimum clamp value, before actually calculating the quotient.

If it is determined that the division result must be clamped, the third aspect terminates the division at once and starts the next division. This improves the throughput of pipelines in the clamping divider when processing consecutive division instructions and shortens a total execution time.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 7A shows a sequence of enable signals when no clamping determination is made in the information processor of FIG. 6B;

FIG. 7B shows a sequence of the enable signals when a clamping divider in the information processor of FIG. 6B determines in the second and third cycles that a quotient will be within a range defined by clamp values;

FIG. 7C shows a sequence of the enable signals when the clamping divider determines in the second cycle that a quotient will be out of the range; and FIG. 7D shows a sequence of the enable signals when the clamping divider determines in the third cycle that a quotient will be out of the range.

DETAILED DESCRIPTION OF THE EMBODIMENTS

Figure 1:
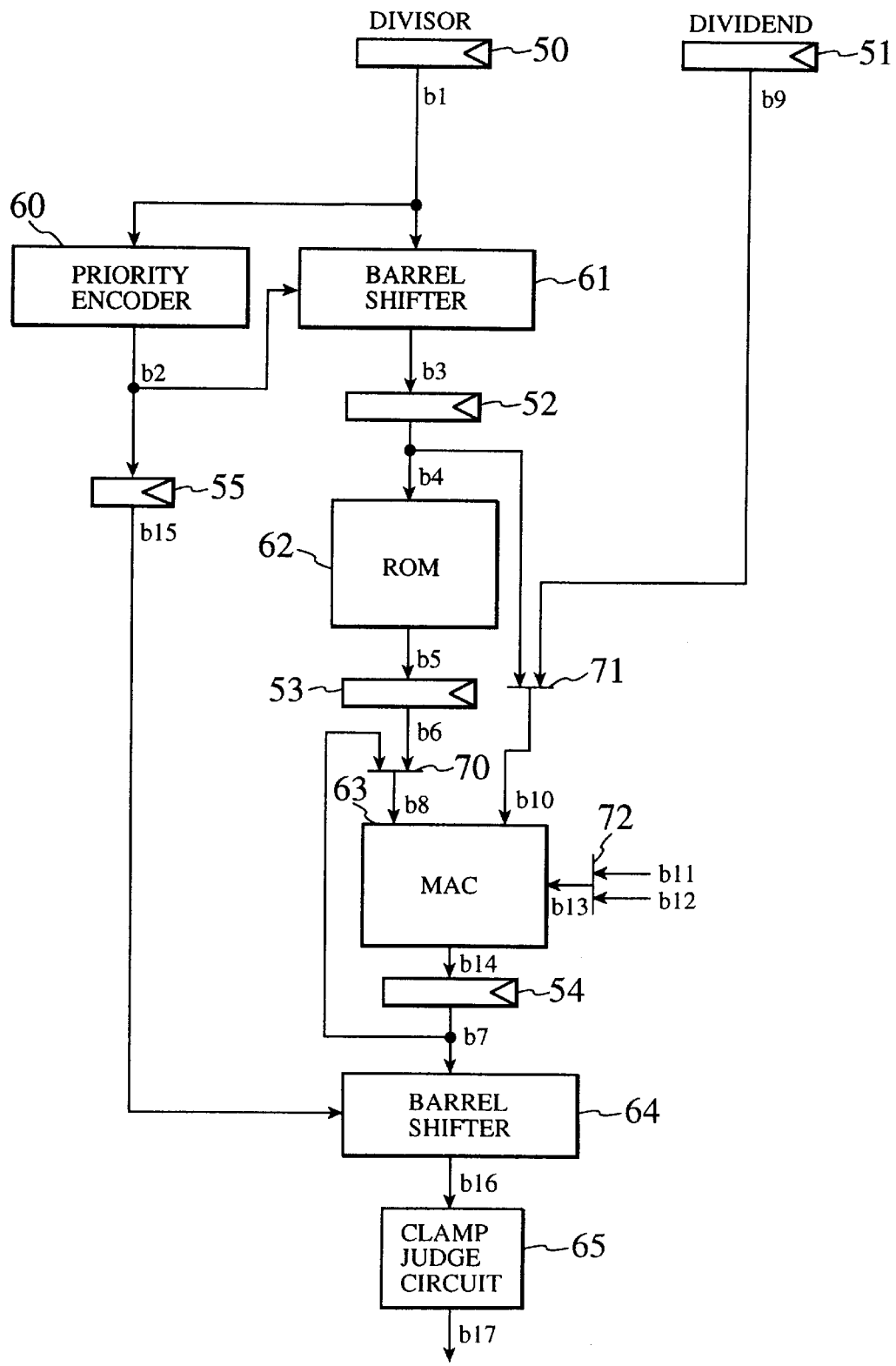
FIG. 1 shows a clamping divider according to a prior art.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

Figure 2:
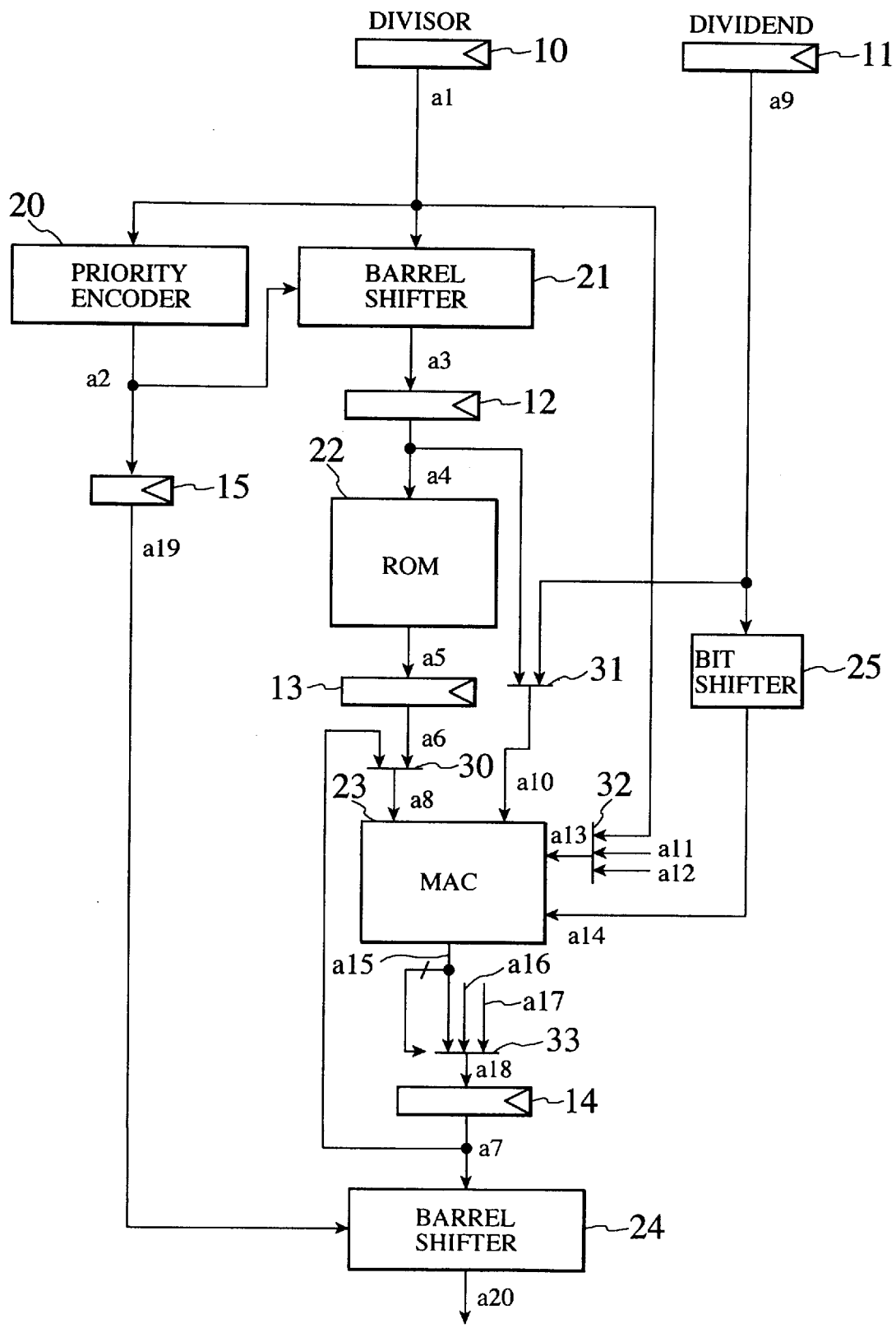
FIG. 2 shows a clamping divider according to a first embodiment of the present invention.

FIG. 2 shows a clamping divider according to the first embodiment of the present invention. The clamping divider has a priority encoder 20 for standardizing a divisor to a value that is equal to or greater than 1 and below 2, an input barrel shifter 21 for shifting the divisor by receiving an encoded result from the priority encoder 20 and the divisor, a ROM 22 for storing the approximate value of the reciprocal of each divisor, a multiple accumulator (MAC) 23, an output barrel shifter 24 for carrying out a shift operation to provide a result of division, and a bit shifter 25 for bit-shifting a dividend so that the dividend is used for the clamping. The MAC 23 has an adder/subtracter and a multiplier, to carry out division, find the reciprocal of the divisor, and determine whether or not a division result must be clamped.

The clamping divider also has a register 10 for holding the divisor, a register 11 for holding the dividend, a register 12 for holding the output of the input barrel shifter 21, a register 13 for holding the output of the ROM 22, an output register 14 for holding the output of the MAC 23, a maximum clamp value, or a minimum clamp value, and a register 15 for holding the output of the priority encoder 20. The clamping divider further has a selector 30 for selecting one of the outputs of the registers 13 and 14 and providing the MAC 23 with the selected one, a selector 31 for selecting one of the outputs of the registers 11 and 12 and providing the MAC 23 with the selected one, a selector 32 for selecting one of the output of the register 10, a value a11 that is "2," and a rounding value a12 that is added for a rounding process and providing the MAC 23 with the selected one, and a selector 33 for selecting one of the output of the MAC 23, the maximum clamp value a16, and the minimum clamp value a17 and providing the output register 14 with the selected one.

Figure 3:
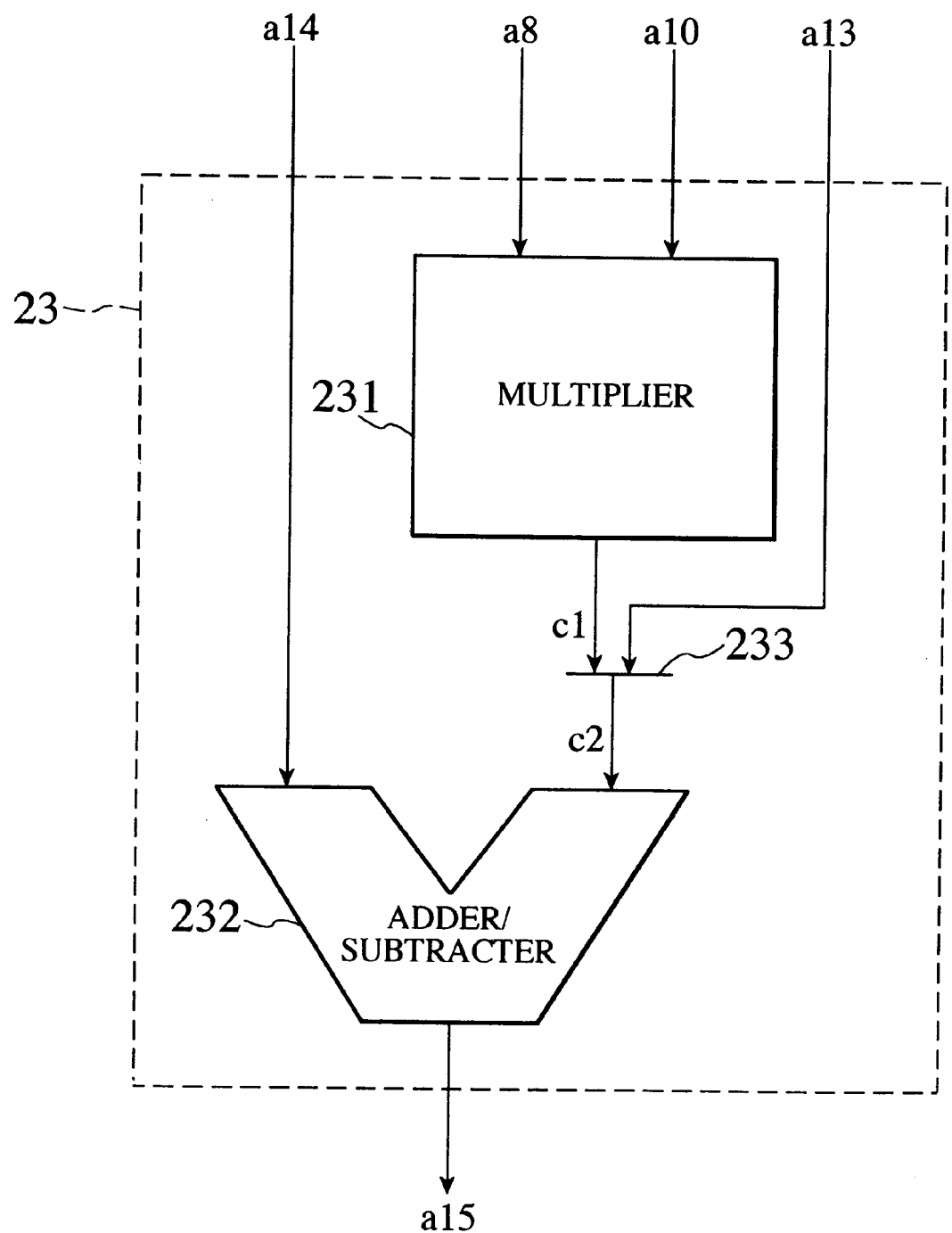
FIG. 3 shows a multiple accumulator (MAC) incorporated in the clamping divider of FIG. 2.

FIG. 3 shows the details of the MAC 23 shown in FIG. 2. The MAC 23 has the multiplier 231, the adder/subtracter 232, and a selector 233. The multiplier 231 receives the output a8 of the selector 30 and the output a10 of the selector 31, calculates the product of the outputs, and provides a result c1 to the selector 233. The selector 233 selects the output c1 or the output a13 of the selector 32 and provides an output c2 to the adder/subtracter 232. The adder/subtracter 232 receives the output a14 of the bit shifter 25 and the output c2, calculates the sum or difference of the outputs, and provides the output a15 of the MAC 23.

The maximum clamp value is $2^m$ and the minimum clamp value is $2^m$ (m and n being each an integer). Accordingly, determining whether or not a division result must be clamped to the maximum clamp value is equal to checking to see if $A/B \geq 2^m$, i.e., $(2^{-m} \times A - B) \geq 0$, where A is a dividend and B is a divisor.

Hardware employs binary expression. Accordingly, multiplying a given figure by $2^{-m}$ is equivalent to shifting the figure in a lower direction by m bits if m is positive, and in a higher direction by $-m$ bits if m is negative. This shifting operation is carried out by the bit shifter 25. Thereafter, the MAC 23 carries out the subtraction, and if a result of the subtraction is positive, it is determined that the division result must be clamped to the maximum clamp value. Determining whether or not the division result must be clamped to the minimum clamp value is equal to checking to see if $A/B \leq 2^n$, i.e., $(2^{-n} \times A - B) \leq 0$. The checking is carried out similar to that with the maximum clamp value. If a result of the subtraction is negative, it is determined that the division result must be clamped to the minimum clamp value.

It is possible to clamp the division result to the maximum clamp value when "$A - 2^m \times B$" is negative, and to the minimum clamp value when "$A - 2^n \times B$" is positive. In these cases, the divisor held in the register 10 is supplied to the bit shifter 25, and the dividend held in the register 11 is supplied to the selector 32.

Division and the clamping carried out by the clamping divider of the first embodiment according to the algorithm Newton will be explained based on pipeline cycles.

In a first cycle, a divisor is set in the register 10 and a dividend in the register 11.

In a second cycle, the divisor is standardized to a value equal to or larger than 1 and below 2. Namely, the register 10 provides an output a1 to the priority encoder 20, which provides an output a2. The input barrel shifter 21 receives the outputs a1 and a2 and provides a shifted result a3 to the register 12. The selector 32 selects the output a1 of the register 10 among the output a1 and the values a11 and a12 and provides the selected one as an output a13 to the MAC 23. The bit shifter 25 receives the output a9 of the register 11 and provides a shifted output a14 corresponding to the maximum clamp value to the MAC 23.

If "m" of the maximum clamp value $2^m$ is positive, the output a14 is obtained by shifting the output a9 (dividend) of the register 11 in a lower direction by m bits. If "m" is negative, the output a14 is obtained by shifting the output a9 in a higher direction by $-m$ bits. The output a13 of the selector 32 and the output a14 of the bit shifter 25 are supplied to the MAC 23, which calculates "a13–a14" and provides a result a15. If the result a15 is positive, a quotient will be greater than the maximum clamp value. In this case, the division operation is terminated at once, and the selector 33 selects the maximum clamp value a16 among the output a15 of the MAC 23, the maximum clamp value a16, and the minimum clamp value a17 and provides the selected one as an output a18 to the output register 14. The output a18 is a final result of the output division operation. If another division instruction follows, it is executed at once through the pipelines. If the output a15 of the MAC 23 is negative, the division operation in question is continued.

In a third cycle, the output a4 of the register 12 is supplied to the ROM 22, which provides an output a5 to the register 13. The output a5 is an approximate value of the reciprocal of the divisor. The selector 32 selects the output a1 of the register 10 among the output a1 and the values a11 and a12 and provides the selected one as an output a13 to the MAC 23. The output a9 of the register 11 is supplied to the bit shifter 25, which provides an output a14 corresponding to the minimum clamp value to the MAC 23. If "n" of the minimum clamp value $2^n$ (n being an integer) is positive, the output a14 of the bit shifter 25 is obtained by shifting the output a9 in a lower direction by n bits. If "n" is negative, the output a14 is obtained by shifting the output a9 in a higher direction by $-n$ bits. The MAC 23 receives the outputs a13 and a14, calculates "a13–a14," and provides an output a15. If the output a15 is negative, the quotient will be below the minimum clamp value. In this case, the division operation is terminated at once, and the selector 33 selects the minimum clamp value a17 among the output a15 of the MAC 23, the maximum clamp value a16, and the minimum clamp value a17 and provides the selected one as an output a18 to the output register 14. The output a18 is a final result of the division. If another division instruction follows, it is executed at once through the pipelines. If the output a15 of the MAC 23 is positive, the division operation in question is continued.

In a fourth cycle, the selector 30 selects the output a6 of the register 13 between the output a6 and the output a7 of the output register 14 and provides the selected one as the selector output a8 to the MAC 23. The selector 31 selects the output a4 of the register 12 between the output a4 and the output a9 of the register 11 and provides the selected one as the selector output a10 to the MAC 23. The selector 32 selects the value a11 of "2" among the output a1 of the register 10 and the values a11 and a12 and provides the selected one as the selector output a13 to the MAC 23. The MAC 23 receives the selector outputs a8, a10, and a13 in which the outputs a8 and a10 serve as multiplication terms and the output a13 as an addition term. The MAC 23 calculates "2−a8×a10" and provides a result thereof as the output a15 to the output register 14 through the selector 33.

In a fifth cycle, the selector 30 selects the output a7 between the outputs a6 and a7 of the registers 13 and 14 and provides the selected one as the selector output a8 to the MAC 23. The selector 31 selects the output a4 between the outputs a4 and a9 of the registers 12 and 11 and provides the selected one as the selector output a10 to the MAC 23. The selector 32 selects the rounding value a12 among the output a1 of the register 10 and the values a11 and a12 and provides the selected one as the selector output a13 to the MAC 23. The MAC 23 receives the selector outputs a8, a10, and a13, calculates "a8×a10," carries out a rounding process, and provides a result thereof as the output a15 to the output register 14 through the selector 33.

The fourth and fifth cycles carry out the step B of the algorithm Newton, i.e., improving the accuracy of the reciprocal of the divisor found in the third cycle. A sixth cycle and following cycles repeat the operation of the fifth cycle until the accuracy of the reciprocal of the divisor reaches a required level.

If the required accuracy level is obtained for the reciprocal of the divisor, an operation corresponding to the step C of the algorithm Newton starts. To multiply the reciprocal of the divisor by the dividend, the selector 30 selects the output a7 between the outputs a6 and a7 of the register 13 and output register 14 and provides the selected one as the selector output a8 to the MAC 23. The selector 31 selects the output a9 between the outputs a4 and a9 of the registers 12 and 11 and provides the selected one as the selector output a10 to the MAC 23. The selector 32 selects the rounding value a12 among the output a1 of the register 10 and the values a11 and a12 and provides the selected one as the selector output a13 to the MAC 23. The MAC 23 receives the selector outputs a8, a10, and a13 and provides a result as the output a15 to the output register 14 through the selector 33.

In the next cycle, the output barrel shifter 24 receives the outputs a7 and a19 of the output register 14 and register 15, shifts the output a7 opposite to the shifting direction of the second cycle by the same number of bits as in the second cycle, and provides an output a20. The output a20 is a final result of the division. This completes the step C of the algorithm Newton.

In this way, the first embodiment of the present invention carries out the clamping without the dedicated clamp judge circuit. The first embodiment employs the MAC 23, which originally serves to calculate a quotient, for determining whether or not the clamping must be carried out during a free time of the pipeline processes that use the MAC 23, to thereby reduce the size of the clamping divider. The first embodiment carries out the clamping determination before calculating a quotient and executes the clamping based on the determination, instead of carrying out the clamping on the quotient. This shortens an execution time of division and the clamping.

Figure 4A:
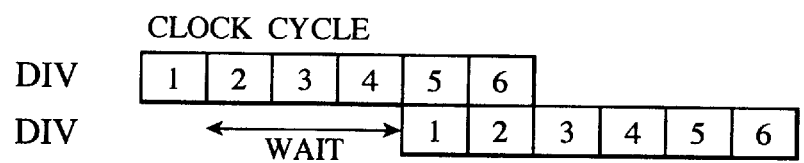
FIG. 4A shows the execution timing of the next division instruction when the clamping divider determines in the second and third cycles that a quotient will be within a range defined by clamp values.
Figure 4B:
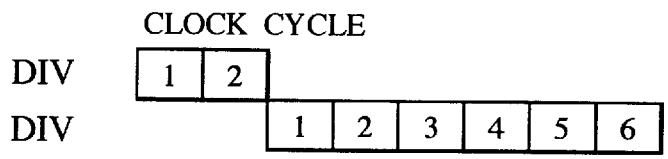
FIG. 4B shows the execution timing of the next division instruction when the clamping divider determines in the second cycle that a quotient will be out of the range.
Figure 4C:
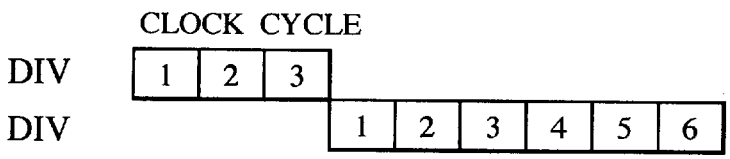
FIG. 4C shows the execution timing of the next division instruction when the clamping divider determines in the third cycle that a quotient will be out of the range.

Each division execution involves a long latency, and therefore, the prior art involves a long wait time when processing consecutive division instructions. In this case, the first embodiment of the present invention determines, on each division execution, whether or not the clamping must be carried out before calculating a quotient of the division. If it is determined that the clamping must be carried out, the first embodiment quickly selects a clamp value as a final result of the division and terminates the division instruction. At the same time, the first embodiment proceeds to the next division instruction or another process with the use of pipelines. FIGS. 4A to 4C show the timing of making a clamping determination and the timing of executing the next division instruction. In the figures, clock cycles 1 to 5 correspond to the first to fifth cycles mentioned above, and a clock cycle 6 corresponds to the cycle of passing data through the barrel shifter 24. If there is a next division instruction in the pipelines, it will quickly be started from a waiting state. In FIG. 4A, the cycles 2 and 3 determine that a quotient will be in the range defined by the clamp values, and the next division execution is started from the cycle 5 by the next division instruction. In FIG. 4B, the cycle 2 determines that a quotient will be out of the range, and the next division execution is started from the cycle 3. In FIG. 4C, the cycle 3 determines that a quotient will be out of the range, and the next division execution is started from the cycle 4. In this way, the next division execution is quickly started, to improve the throughput of the clamping divider when processing consecutive division instructions and shorten an overall execution time.

In the above embodiment, the second cycle determines whether or not a quotient exceeds the maximum clamp value and the third cycle whether or not the quotient is below the minimum clamp value. These executions of the second and third cycles may be replaced with each other. In some case, one of the clamping determination operations may be omitted. From the next cycle (the fourth cycle), the MAC 23 is used for an original purpose of the division execution. It is important that the MAC 23 is used to carry out the clamping operations (in the second and third cycles in the first embodiment) before the MAC 23 is used for the original purpose (in the fourth cycle in the first embodiment) of calculating a quotient.

Second Embodiment

Figure 5:
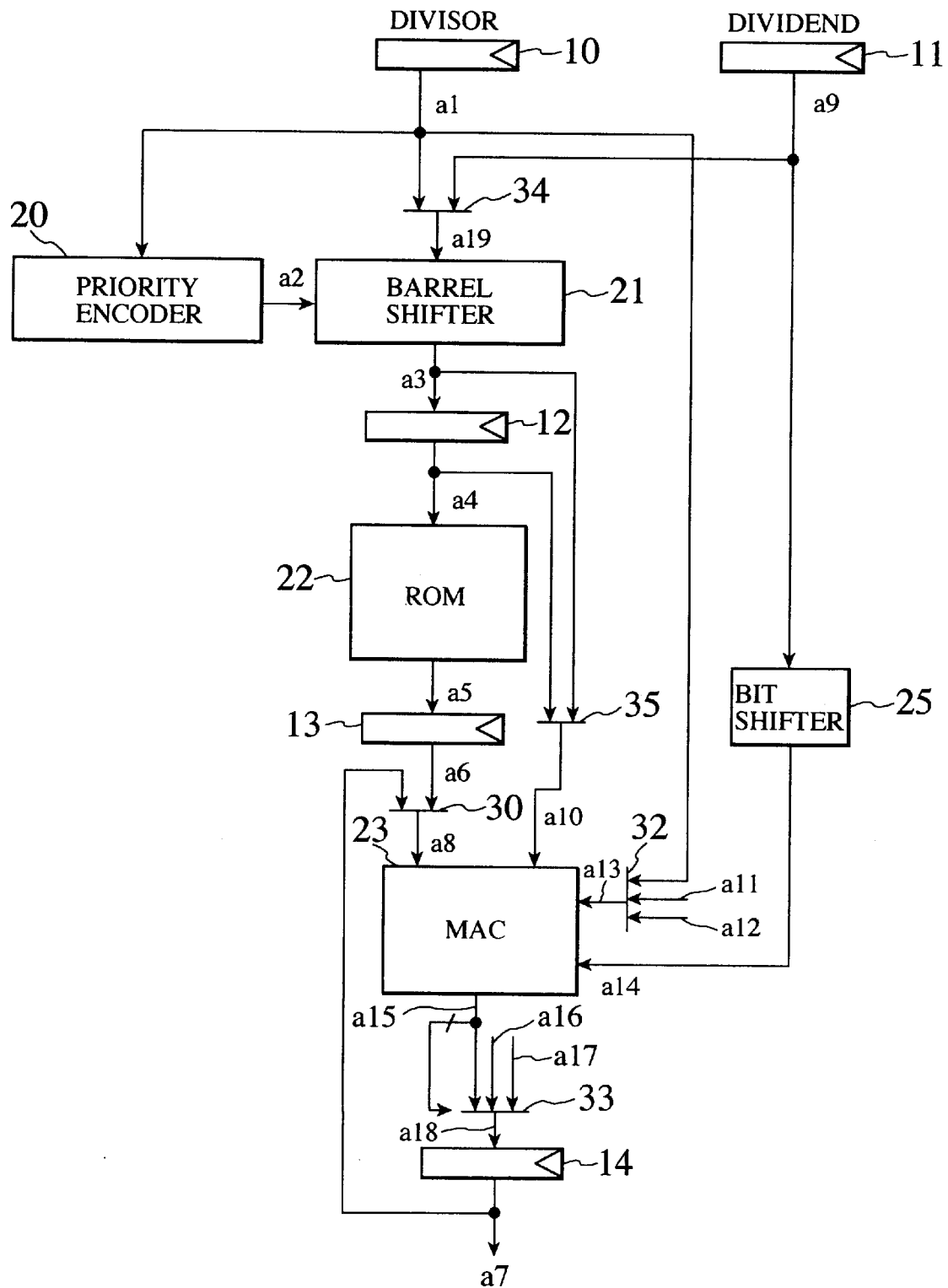
FIG. 5 shows a clamping divider according to a second embodiment of the present invention.

FIG. 5 shows a clamping divider according to the second embodiment of the present invention. The characteristics of this divider will be explained.

(i) An input selector 34 selects the output a1 (a divisor) of a register 10 or the output a9 (a dividend) of a register 11 and supplies the selected one as an output a19 to an input barrel shifter 21, unlike the first embodiment that directly supplies the output a1 to the input barrel shifter 21. Since the second embodiment is capable of supplying the dividend, i.e., the output a9 of the register 11 to the input barrel shifter 21, the dividend may be shifted in advance when a multiple accumulator (MAC) 23 multiplies the reciprocal of the divisor by the dividend in the last cycle.

(ii) A selector 35 is used instead of the selector 31 of the first embodiment. The selector 35 selects the output a3 of the input barrel shifter 21 or the output a4 of a register 12 and supplies the selected one as an output a10 to the MAC 23.

The other operations of the second embodiment are the same as those of the first embodiment.

The second embodiment limits a maximum clamp value to "1" so that a dividend may be shifted in advance by the same number of bits as for a divisor, instead of carrying out the shift operation in the last stage of a division execution.

This is made because a division result is always clamped to the maximum clamp value if the dividend causes a bit overflow.

This will be explained in detail. If a division instruction has a divisor of "0011" and a dividend of "0110," the divisor will be shifted by two bits. Accordingly, the dividend will be shifted to "1000" to cause a bit overflow to make a division execution impossible. This kind of overflow always occurs when a dividend is greater than a divisor, i.e., when a quotient is greater than "1." If the maximum clamp value is limited to "1," the fact that the quotient is greater than "1" is always detected by the clamping operation before the dividend causes a bit overflow, to thereby secure a normal operation.

In this way, the second embodiment provides, in addition to the effect of the first embodiment, an effect of omitting the shift operation from the last stage (step B) of the algorithm Newton because the second embodiment limits the maximum clamp value to "1" or smaller. This results in further shortening a division execution time. In addition, the second embodiment is able to omit one barrel shifter (see the output barrel shifter 24 in FIG. 2), to make the clamping divider compact as shown in FIG. 5.

Third Embodiment

Figure 6A:
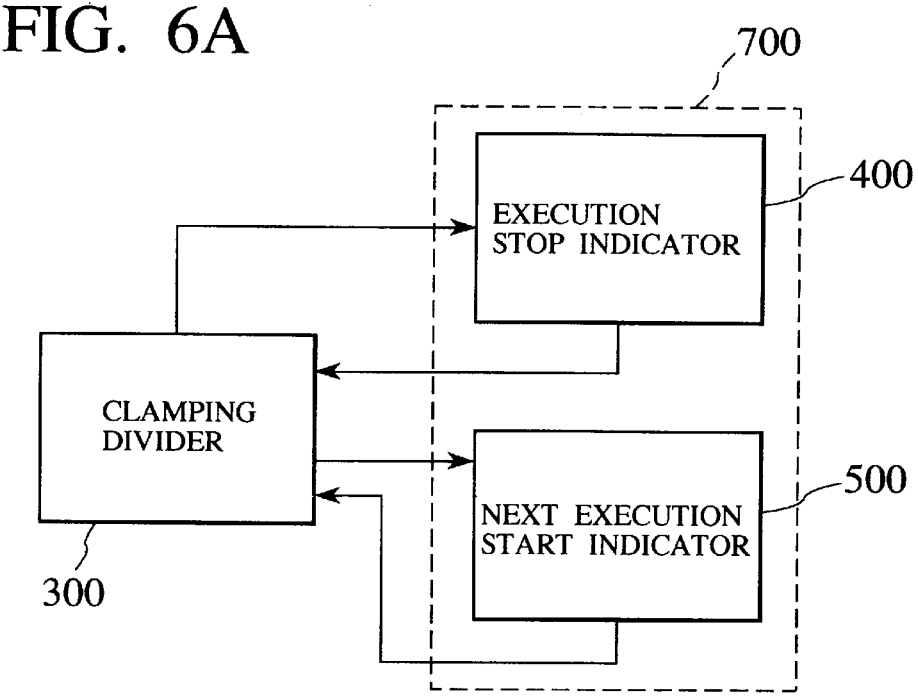
FIG. 6A shows an information processor according to a third embodiment of the present invention.

FIG. 6A shows an information processor having a clamping divider 300, according to the third embodiment of the present invention. The information processor also has a unit 400 for instructing the clamping divider 300 to stop executing a division if the clamping divider 300 determines that a division result must be clamped, and a unit 500 for instructing the clamping divider 300 to start the next division if it follows just after the stopped division execution. This structure realizes the functions of the divider of any one of the first and second embodiments.

The combination of units 400 and 500 are equivalent to a control signal generator 700 (FIG. 6B) for generating an operation fixed signal and write enable signals. The operation fixed signal indicates that a division result has been fixed. And the write enable signals are the signals for writing data into registers 10 to 15 contained in the clamping divider 300. The registers 10 to 15 correspond to the registers 10 to 15 of the clamping divider of FIG. 2. In response to a signal a15 indicating whether or not the clamping must be carried out, the control signal generator 700 generates the write enable signals for the registers 10 to 15 and the operation fixed signal a25 in respective clock cycles.

FIG. 7A shows a sequence of the write enable signals for the registers 10 to 15 when no clamping is carried out. The enable signal for the register 15 may be provided in any one of clock cycles 3, 4, and 5.

Operations when a division instruction (a first division instruction) that is presently being executed is followed by a next division instruction (a second division instruction) will be explained.

(a) If a quotient of a first division execution by the first division instruction is within a range defined by clamp values like FIG. 4A, the write enable signals for the registers 10 to 15 are provided in clock cycles shown in FIG. 7B. A suffix (1) is for the first division instruction and (2) for the second division instruction. The operation fixed signal a25 is provided in each of clock cycles 5 and 10.

(b) If clock cycle 2 determines that the quotient of the first division execution is out of the range like FIG. 4B, the write enable signals for the registers 10 to 15 are provided in clock cycles shown in FIG. 7C. Namely, the clamping determination signal a15 is provided in clock cycle 2. In response to this signal, the write enable signals for the first division execution are stopped, the operation fixed signal a25 is provided, and the sequence of FIG. 7A is started for the second division instruction from the next clock cycle.

(c) If clock cycle 3 determines that the quotient of the first division execution is out of the range like FIG. 4C, the write enable signals for the registers 10 to 15 are provided in clock cycles shown in FIG. 7D. Namely, the clamping determination signal a15 is provided in clock cycle 3. In response to this signal, the write enable signals for the first division execution are stopped, the operation fixed signal a25 is provided, and the sequence of FIG. 7A is started for the second division instruction from the next clock cycle.

In summary, the write enable signals are basically generated according to the sequence of FIG. 7A. If a result of a given division execution must be clamped, the sequence of FIG. 7A for the next division execution is started from a clock cycle next to the clock cycle in which the result of the given division execution is clamped. If no clamping is made, the operation fixed signal a25 is enabled in clock cycle 5 in the sequence of FIG. 7A. If the clamping is made, the operation fixed signal a25 is enabled in the clock cycle in which the clamping is made.

Figure 6B:
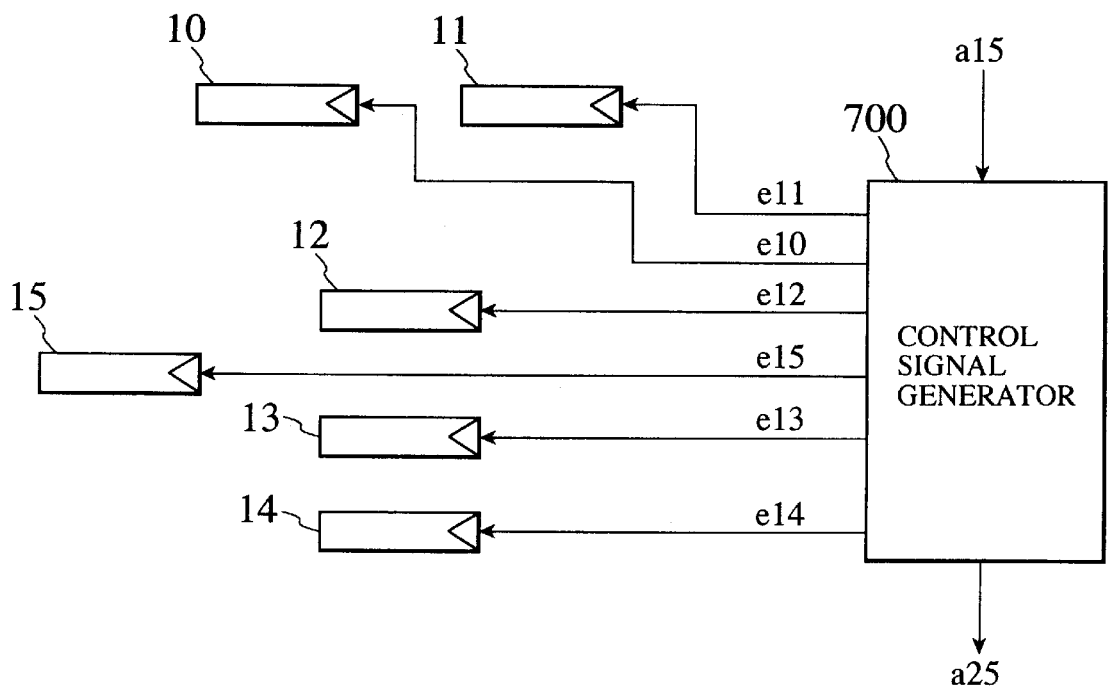
FIG. 6B shows the details of the information processor of FIG. 6A.

The structures of FIGS. 6A and 6B improve the total throughput of the information processor and shorten an overall execution time.

Various modifications will become possible for those skilled in the art after receiving the teachings of the present disclosure without departing from the scope thereof.

What is claimed is:

1. A clamping divider to be formed in a pipeline processor operating with a sequence of cycles, for clamping a result of a division to a maximum clamp value of $2^m$ (m being an integer) if a quotient of the division is determined to become equal to or larger than the maximum clamp value and to a minimum claim value of $2^n$ (n being an integer) if the quotient is determined to become equal to or smaller than the minimum clamp value, comprising:

(a) a bit shifter for shiftings at a one of cycles in the sequence of the cycles, a divisor or a dividend of the division in a higher or lower direction by m bits, and shifting, at another one of cycles in the sequence of the cycles, the divisor or the dividend in a higher or lower direction by n bits;

(b) a multiple accumulator (MAC) for subtracting the dividend or divisor shifted by the bit shifter from the divisor or dividend, and according to a result of the subtraction, determining at the one cycle whether or not the result of the division must be clamped to the maximum clamp value before calculating the quotient, determining at the another one cycle whether or not the result of the division must be clamped to the minimum clamp value before calculating the quotient, and calculating the quotient at a cycle after the one and another one cycles; and (c) an output circuit for providing the result of the division according to the determination made by the MAC.

2. The clamping divider of claim 1, further comprising a priority encoder for receiving a divisor for standardizing the divisor to a value and an input barrel shifter for receiving the output of the priority encoder, the divisor and a dividend, wherein the maximum clamp value is set to "1" or below, the dividend and the divisor are shifted by the input barrel shifter, and the MAC multiplies the shifted dividend by a reciprocal of the divisor to determine the quotient.

3. The clamping divider of claim 1, wherein the MAC has a multiplier and an adder/subtracter.

4. The clamping divider of claim 2, wherein the MAC has a multiplier and an adder/subtracter.

5. A clamping divider for clamping a result of a division to a maximum clamp value of $2^m$ (m being an integer) if a quotient of the division is equal to or larger than the maximum clamp value and to a minimum clamp value of $2^n$ (n being an integer) if the quotient is equal to or smaller than the minimum clamp value, comprising:
(a) a bit shifter for shifting a divisor or a dividend of the division in a higher or lower direction by m bits when determining whether or not the quotient is equal to or greater than the maximum clamp value, and in a higher or lower direction by n bits when determining whether or not the quotient is equal to or smaller than the minimum clamp value;
(b) a multiple accumulator (MAC) for subtracting the dividend or divisor shifted by the bit shifter from the divisor or dividend and according to a result of the subtraction, before calculating the quotient, determining whether or not the result of the division must be clamped to the maximum or minimum clamp value; and
(c) an output circuit for providing the result of the division according to the determination made by the MAC, wherein the output circuit comprises:
a 3-input selector for receiving the output of the MAC and the maximum and minimum clamp values; and
an output register for holding the output of the selector.

6. A clamping divider for clamping a result of a division to a maximum clamp value of $2^m$ (m being an integer) if a quotient of the division is equal to or larger than the maximum clamp value and to a minimum clamp value of $2^n$ (n being an integer) if the quotient is equal to or smaller than the minimum clamp value, comprising:
(a) a priority encoder for receiving a divisor for standardizing the divisor to a value;
(b) an input barrel shifter for receiving the output of the priority encoder, the divisor and a dividend, shifting the divisor and the dividend;
(c) a bit shifter for shifting a divisor or a dividend of the division in a higher or lower direction by m bits when determining whether or not the quotient is equal to or greater than the maximum clamp value of "1" or below, in a higher or lower direction by n bits when determining whether or not the quotient is equal to or smaller than the minimum clamp value;
(d) a multiple accumulator (MAC) for subtracting the dividend or divisor shifted by the bit shifter from the divisor or dividend shifted by the input barrel shifter, and, according to a result of the subtraction, before calculating the quotient, determining whether or not the result of the division must be clamped to the maximum or minimum clamp value; and
(e) an output circuit for providing the result of the division according to the determination made by the MAC, wherein the output circuit comprises:
a 3-input selector for receiving the output of the MAC and the maximum and minimum clamp values; and
an output register for holding the output of the selector.

7. The clamping divider of claim 5, further comprising an output barrel shifter connected to the output register.

8. The clamping divider of claim 5, further comprising:
a priority encoder for receiving the divisor;
an input barrel shifter for receiving the output of the priority encoder as well as the divisor; and
a ROM for receiving the output of the input barrel shifter through a register, wherein:
the output of the ROM is supplied to the MAC through a register and a selector.

9. The clamping divider of claim 6, further comprising:
a ROM for receiving the output of the input barrel shifter through a register, wherein:
the output of the ROM is supplied to the MAC through a register and a selector.

10. The clamping divider of claim 9, further comprising an input selector connected to the input side of the input barrel shifter, to select one of the divisor and dividend.

11. A processor comprising:
(a) a clamping divider having:
a bit shifter for shifting a divisor or a dividend of a division in a higher or lower direction by m bits when determining whether or not a quotient of the division is equal to or greater, than a maximum clamp value, and in a higher or lower direction by n bits when determining whether or not the quotient is equal to or smaller than a minimum clamp value;
a multiple accumulator (MAC) for subtracting the dividend or divisor shifted by the bit shifter from the divisor or dividend, and according to a result of the subtraction and before calculating the quotient, determining whether or not a result of the division must be clamped to the maximum or minimum clamp value; and
an output circuit for providing the result of the division according to the determination made by the MAC;
(b) a unit for instructing the clamping divider to stop executing the division by a division instruction if the clamping divider determines that the result of the division execution must be clamped; and
(c) another unit for instructing the clamping divider to start a next division execution if a next division instruction follows just after the division instruction.

12. The processor of claim 11, wherein the maximum clamp value is set to "1" or below, the dividend is shifted like the divisor, the dividend is standardized like the divisor, and the MAC multiplies the shifted dividend by a reciprocal of the divisor, to find out the quotient.

13. A pipeline processing method with a sequence of cycles for clamping a result of a division to a maximum clamp value of $2^m$ (m being an integer) if a quotient of the division is equal to or larger than the maximum clamp value and to a minimum clamp value of $2^n$ (n being an integer) if the quotient is equal to or smaller than the minimum clamp value, the sequence comprising the steps of:
shifting a divisor or a dividend of the division in a higher or lower direction by m bits by a bit shifter, subtracting the shifted dividend or divisor from the dividend or the divisor to determine whether or not the result of the division must be clamped to the maximum value, in one cycle;
shifting the divisor or dividend in a higher or lower direction by n bits by the bit shifter, subtracting the shifted dividend or divisor from the dividend or the divisor to determine whether or not the quotient is equal to or smaller than the minimum clamp value in another one cycle; and
calculating the quotient in a cycle, after the one and the another cycles.

14. The pipeline processing method of claim 13, wherein the maximum clamp value is set to "1" or below.

15. A clamping divider for clamping a result of a division to a maximum clamp value of $2^m$ (m being an integer) if a quotient of the division is equal to or larger than the maximum clamp value and to a minimum clamp value of $2^n$ (n being an integer) if the quotient is equal to or smaller than the minimum clamp value, comprising:

(a) a bit shifter for shifting a divisor or a dividend of the division in a higher or lower direction by m bits, and in a higher or lower direction by n bits;

(b) a multiple accumulator (MAC) for subtracting the dividend or divisor shifted by the bit shifter from the divisor or dividend, and according to a result of the subtraction and before calculating the quotient, determining whether or not the result of the division must be clamped to the maximum or minimum clamp value;

(c) a 3-input selector for receiving the divisor, a value of "2" and a rounding value, being connected to the MAC; and (d) an output circuit for providing the result of the division according to the determination made by the MAC.

16. The clamping divider of claim 15, further comprising a priority encoder for receiving a divisor and standardizing the divisor to a value and an input barrel shifter for receiving the output of the priority encoder, the divisor and a dividend, wherein the maximum clamp value is set to "1" or below, the dividend and the divisor are shifted by the input barrel shifter, and the MAC multiplies the shifted dividend by a reciprocal of the divisor to determine the quotient.

17. The clamping divider of claim 5, wherein the MAC has a multiplier, a 2-input selector receiving the output of the multiplier and the output of the 3-input selector and an adder/subtracter connected to the 2-input selector.

18. The clamping divider of claim 15, wherein the MAC has a multiplier, a 2-input selector receiving the output of the multiplier and the output of the 3-input selector and an adder/subtracter connected to the 2-input selector.

19. The pipeline processing method of claim 14, wherein the one cycle further include the steps of:

standardizing the divisor; and shifting the divisor and the dividend by a barrel shifter.

20. A pipeline processing method for clamping a result of a division to a maximum value of $2^m$ (m being an integer) and to a minimum clamp value of $2^n$ (n being an integer), comprising the steps of:

storing a divisor and a dividend into registers, respectively, in a first cycle;

standardizing the divisor, shifting the divisor, shifting the dividend in a higher or lower direction by m bits, and subtracting the dividend from the divisor to determine whether or not the quotient is equal to or greater than the maximum clamp value, in a second cycle;

shifting the dividend in a higher or lower direction by n bits, and subtracting the dividend from the divisor to determine whether or not the quotient is equal to or smaller than the minimum clamp value, in a third cycle;

calculating an intermediate result in a fourth cycle;

calculating the quotient in a fifth cycle by using the intermediate result; and outputting the quotient in a sixth cycle.

21. A pipeline processing method for clamping a result of a division to a maximum value of $2^m$ (m being an integer) and to a minimum clamp value of $2^n$ (n being an integer), comprising the steps of:

storing a divisor and a dividend into registers, respectively, in a first cycle;

standardizing the divisor, shifting the divisor, shifting the dividend in a higher or lower direction by n bits, and subtracting the dividend from the divisor to determine whether or not the quotient is equal to or smaller than the minimum clamp value, in a second cycle;

shifting the dividend in a higher or lower direction by m bits, and subtracting the dividend from the divisor to determine whether or not the quotient is equal to or greater than the maximum clamp value, in a third cycle;

calculating an intermediate result, in a fourth cycle;

calculating the quotient in a fifth cycle by using the intermediate result; and outputting the quotient, in a sixth cycle.

22. A pipeline processing method for clamping a result of a division to a maximum value of "1" or below and to a minimum clamp value of $2^n$ (n being an integer), comprising the steps of:

storing a divisor and a dividend into registers, respectively, in a first cycle;

standardizing the divisor, shifting the divisor and dividend, and subtracting the dividend from the divisor to determine whether or not the quotient is equal to or greater than "1," in a second cycle;

shifting the dividend in a higher direction by n bits, and subtracting the dividend from the divisor to determine whether or not the quotient is equal to or smaller than the minimum clamp value, in a third cycle;

calculating an intermediate result, in a fourth cycle;

calculating the quotient, in a fifth cycle, by using the intermediate result; and outputting the quotient in a sixth cycle.

23. A pipeline processing method for clamping a result of a division to a maximum value of "1" or below and to a minimum clamp value of $2^n$ (n being an integer), comprising the cycles of:

storing a divisor and a dividend into registers, respectively, in a first cycle;

standardizing the divisor, shifting the divisor and dividend, shifting the dividend in a higher direction by n bits, and subtracting the dividend from the divisor to determine whether or not the quotient is equal to or smaller than the minimum clamp value, in a second cycle;

subtracting the dividend from the divisor to determine whether or not the quotient is equal to or greater than "1," in a third cycle;

calculating an intermediate result, in a fourth cycle;

calculating the quotient, in a fifth cycle, using the intermediate result; and outputting the quotient, in a sixth cycle.

* * * * *